United States Patent
Achor et al.

(10) Patent No.: US 9,234,483 B2
(45) Date of Patent: Jan. 12, 2016

(54) THERMOELECTRIC COOLED PUMP

(75) Inventors: Kyle Dean Achor, Monticello, IN (US); Michael Shawn Richards, Kokomo, IN (US)

(73) Assignee: Carter Fuel Systems, LLC, Cleveland, OH (US)

( * ) Notice: Subject to any disclaimer, the term of this patent is extended or adjusted under 35 U.S.C. 154(b) by 0 days.

(21) Appl. No.: 12/938,975

(22) Filed: Nov. 3, 2010

(65) Prior Publication Data

US 2012/0103284 A1 May 3, 2012

(51) Int. Cl.
| | | |
|---|---|---|
| *F02M 15/00* | (2006.01) | |
| *F01P 1/06* | (2006.01) | |
| *F01P 9/00* | (2006.01) | |
| *F02M 31/20* | (2006.01) | |
| *F02M 37/00* | (2006.01) | |
| *F01P 3/20* | (2006.01) | |

(52) U.S. Cl.
CPC .............. *F02M 31/20* (2013.01); *F02M 37/00* (2013.01); *F01P 3/202* (2013.01); *Y02T 10/126* (2013.01); *Y02T 10/166* (2013.01)

(58) Field of Classification Search
CPC ... F02M 31/20; F02M 37/20; F02M 37/0052; F02M 53/00; F01P 3/20; F01P 7/165; F01P 11/04; F01P 11/06; F02B 3/06
USPC ........................................................ 123/541
See application file for complete search history.

(56) References Cited

U.S. PATENT DOCUMENTS

| | | |
|---|---|---|
| 3,411,392 A | 11/1968 | Spangler |
| 3,477,238 A * | 11/1969 | Race ............................. 62/3.61 |
| 3,841,720 A | 10/1974 | Kovach et al. |
| 3,874,183 A | 4/1975 | Tabet |
| 4,671,071 A | 6/1987 | Sasaki |
| 4,708,118 A | 11/1987 | Rawlings |
| 4,732,588 A | 3/1988 | Covert et al. |
| 5,255,735 A | 10/1993 | Raghava et al. |
| 5,438,962 A | 8/1995 | Iwata et al. |
| 5,555,855 A | 9/1996 | Takahashi |
| 5,636,668 A | 6/1997 | Thompson |
| 5,647,331 A * | 7/1997 | Swanson ........................ 123/516 |
| 5,887,555 A * | 3/1999 | Schmitz ...................... 123/41.31 |
| 5,908,020 A * | 6/1999 | Boutwell et al. .............. 123/541 |
| 5,931,141 A | 8/1999 | Chino |
| 6,176,259 B1 | 1/2001 | Harde et al. |
| 6,322,410 B1 * | 11/2001 | Harvey ........................ 440/88 R |
| 6,533,002 B1 | 3/2003 | Kobayashi et al. |
| 6,718,954 B2 | 4/2004 | Ryon |
| 6,899,580 B1 | 5/2005 | Kollmann |
| 6,957,542 B1 | 10/2005 | Kido et al. |
| 7,000,651 B2 | 2/2006 | Fink, Jr. et al. |
| 7,832,380 B1 * | 11/2010 | Abou Zeid et al. ........... 123/519 |
| 2002/0108604 A1 | 8/2002 | Distelhoff et al. |
| 2004/0231648 A1 | 11/2004 | Katayama |
| 2008/0135081 A1 | 6/2008 | Sharifi et al. |

FOREIGN PATENT DOCUMENTS

| | | |
|---|---|---|
| EP | 0400223 A1 | 12/1990 |
| JP | 2001130270 A | 1/2005 |
| WO | 2005/064145 A1 | 7/2005 |

* cited by examiner

*Primary Examiner* — Lindsay Low
*Assistant Examiner* — Syed O Hasan
(74) *Attorney, Agent, or Firm* — Jones Day

(57) ABSTRACT

This invention relates to an engine cooling system in which the supply of fuel is cooled to prevent fuel vapors by cooling the fuel pump. The cooling system uses a thermoelectric material that, either entirely or partially, surrounds the fuel pump, is the housing of the fuel pump and/or is internal to the fuel pump.

10 Claims, 5 Drawing Sheets

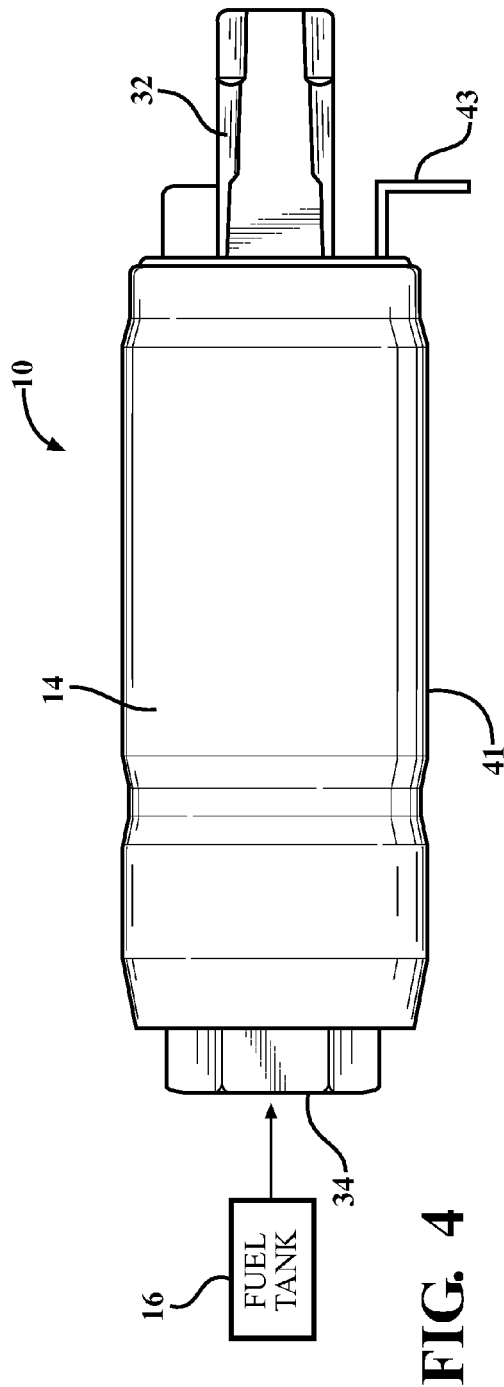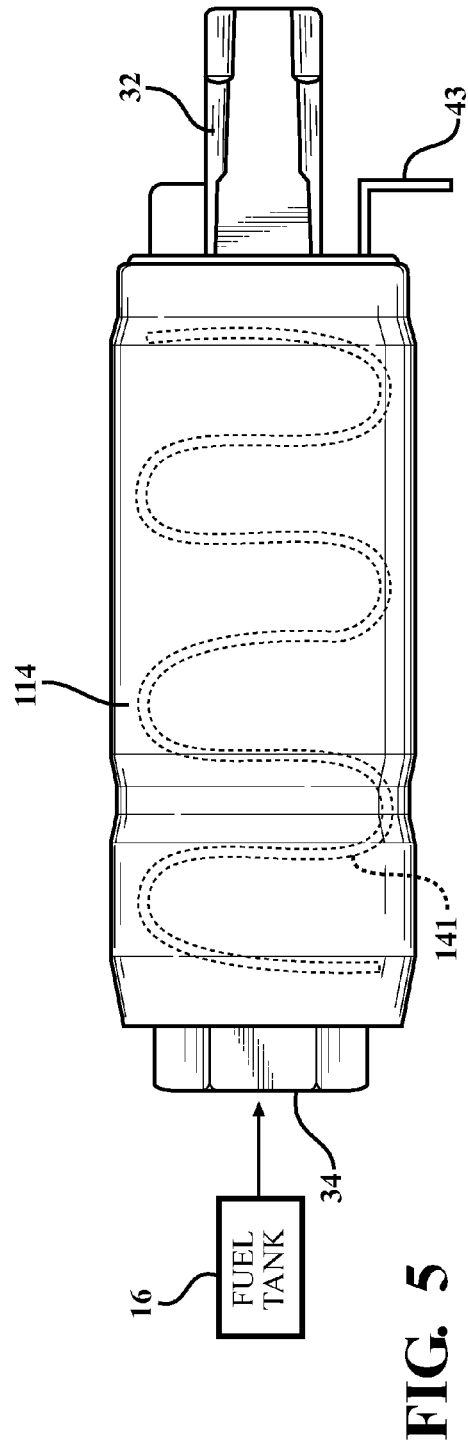
FIG. 4
FIG. 5

THERMOELECTRIC COOLED PUMP

TECHNICAL FIELD

The invention relates to an engine cooling system in which the supply of fuel is cooled to prevent fuel vapors by cooling the fuel pump.

BACKGROUND OF THE INVENTION

It is well known in the art to cool a fuel pump which supplied fuel to an engine, for example, a marine engine. U.S. Pat. No. 5,438,962 discloses a water cooled outboard motor engine ensuring that the fuel pumped by the fuel pump is not overheated. Specifically, a marine engine is water cooled and provided with a coolant delivery system for drawing water from a body of water in which the engine is operating, which circulates the water through a cooling jacket of the engine and discharges it back into the body of water. The cooling system includes a water inlet formed in a lower unit and permits water to be drawn through an inlet conduit by means of a water pump. The drawn water is delivered upwardly through a supply conduit that communicates with a cooling jacket. This coolant is circulated through the cooling jacket of engine and discharged through discharge conduit for return to the body of water.

US Publication 2004/0231648 discloses a watercraft engine fuel cooling system that cools a fuel vapor separator through a detachable heat exchanger. Fuel inside the vapor separator tank is kept at a predetermined temperature through the vapor separator cooling system. The vapor separator cooling system can include a detachable heat exchanger that is configured to be detachable from the vapor separator tank. When brought into thermal communication with the vapor separator tank, the heat exchanger transfers heat away from the vapor separator tank. The heat exchanger can use cooling water or other fluids for cooling.

U.S. Pat. No. 6,322,410 discloses a water cooled electric fuel pump for a marine propulsion system. A cooling jacket is disposed about the fuel pump and is in sealed engagement with fuel pump to form a cooling chamber about the fuel pump. The cooling jacket has a water inlet for admitting cooling water to the cooling chamber.

SUMMARY OF THE INVENTION

In general terms, the invention relates to an engine cooling system in which the supply of fuel is cooled to prevent fuel vapors by cooling the fuel pump. The cooling system uses a thermoelectric material that, either entirely or partially, surrounds the fuel pump, is the housing of the fuel pump and/or is internal to the fuel pump.

In one embodiment of the invention, there is a propulsion assembly, including an internal combustion engine; an elongated fuel pump for pumping fuel from a fuel tank to the internal combustion engine, the fuel pump extends longitudinally along an axis between first and second ends and is oriented with its longitudinal axis in a substantially horizontal plane; and a cooling material of the fuel pump configured to reduce a temperature of liquid flowing in the fuel pump.

In another embodiment of the invention, there is a fuel pump for use with an internal combustion engine, comprising a cooling material configured to reduce a temperature of liquid flowing in the fuel pump, wherein the fuel pump extends longitudinally along an axis between first and second ends and is oriented with its longitudinal axis in a substantially horizontal plane.

In one aspect of the invention, the cooling material is at least partially disposed about the fuel pump to form a jacket around a housing of the fuel pump to act as a cooling mechanism for the fuel pump.

In another aspect of the invention, the jacket is completely disposed about the housing of the fuel pump.

In still another aspect of the invention, the jacket is formed around one of an exterior or interior side of the housing.

In a further aspect of the invention, the cooling material forms at least part of a housing of the fuel pump.

In yet another aspect of the invention, the cooling material forms the entire housing of the fuel pump.

In another aspect of the invention, the cooling material is disposed inside of the fuel pump and formed as a shape.

In still a further aspect of the invention, the shape of the cooling material is at least one of a snake extending in a horizontal plane of the fuel pump between first and second ends, at least one plate disposed between first and second ends of the fuel pump and a spiral extending between first and second ends of the fuel pump.

In another aspect of the invention, the cooling material is a thermoelectric material.

In still another aspect of the invention, the engine is a marine engine.

These and other features and advantages of this invention will become more apparent to those skilled in the art from the detailed description of a preferred embodiment. The drawings that accompany the detailed description are described below.

BRIEF DESCRIPTION OF THE DRAWINGS

FIG. 4 illustrates an exemplary fuel pump for use in a propulsion assembly in accordance with one embodiment of the invention.

FIG. 5 illustrates another exemplary fuel pump for use in a propulsion assembly in accordance with one embodiment of the invention.

DETAILED DESCRIPTION OF A PREFERRED EMBODIMENT

In general terms, the invention relates to an engine cooling system in which the supply of fuel is cooled to prevent fuel vapors by cooling the fuel pump. The cooling system uses a thermoelectric material that, either entirely or partially, surrounds the fuel pump, is the housing of the fuel pump and/or is internal to the fuel pump.

Figure 1:
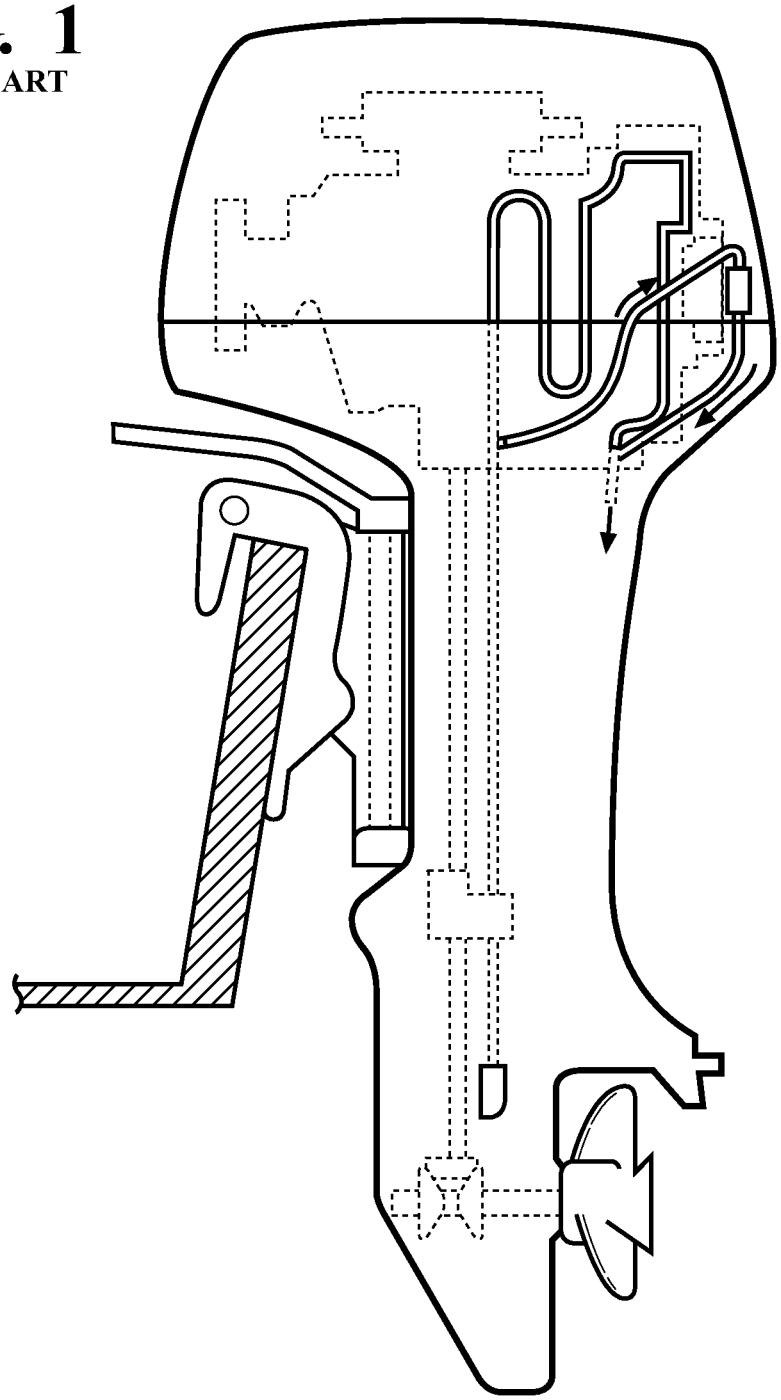
FIG. 1 is a side view of an outboard motor attached to the transom of a watercraft, shown partially and in cross section, in accordance with the prior art.
Figure 2:
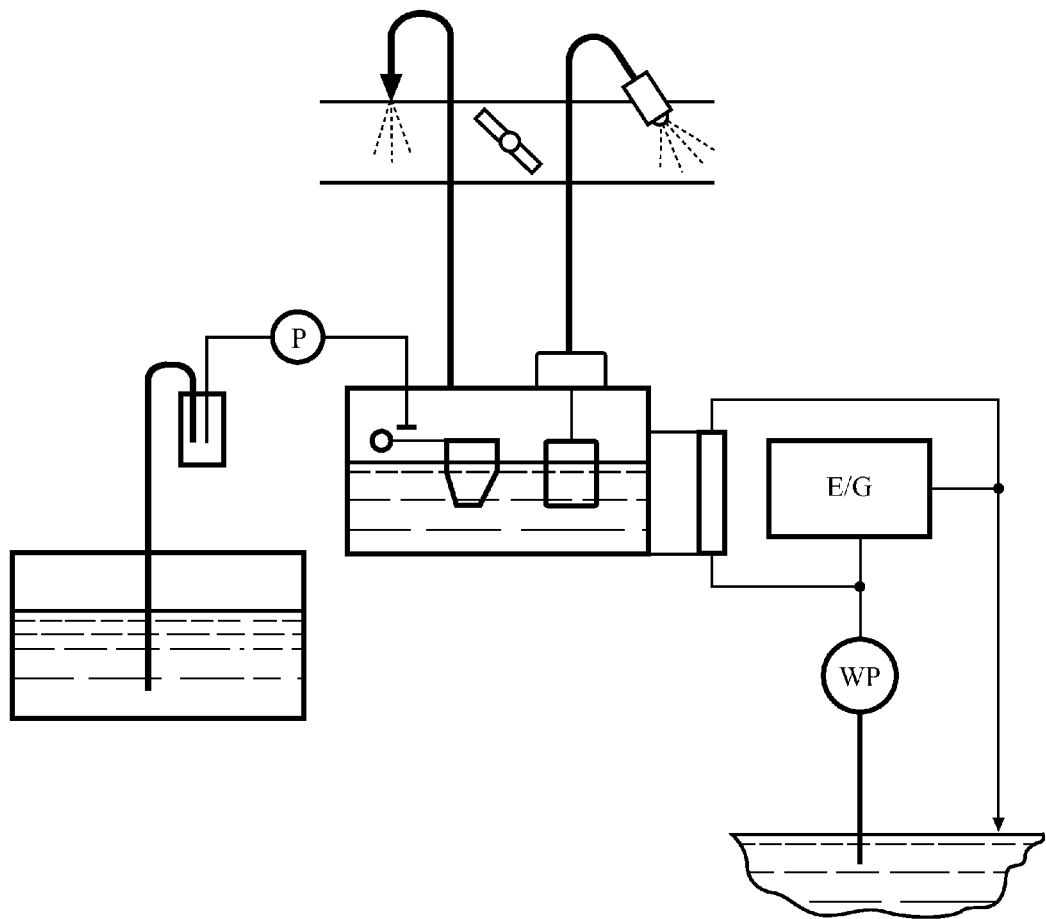
FIG. 2 is a schematic diagram of a fuel system including a vapor separator and cooling body of water in accordance with the prior art.
Figure 3:
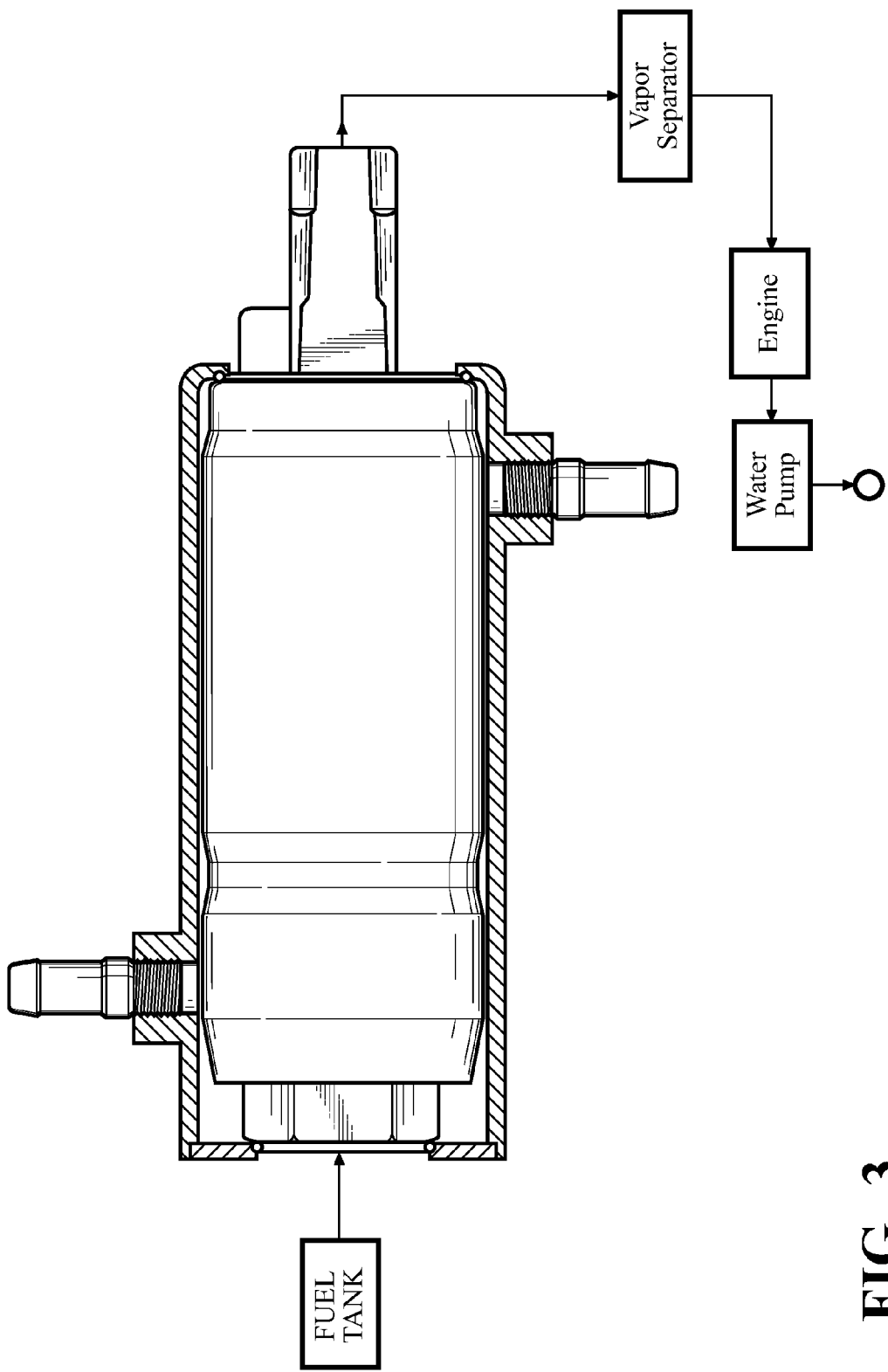
FIG. 3 illustrates a marine propulsion assembly in accordance with the prior art.
Figure 6:
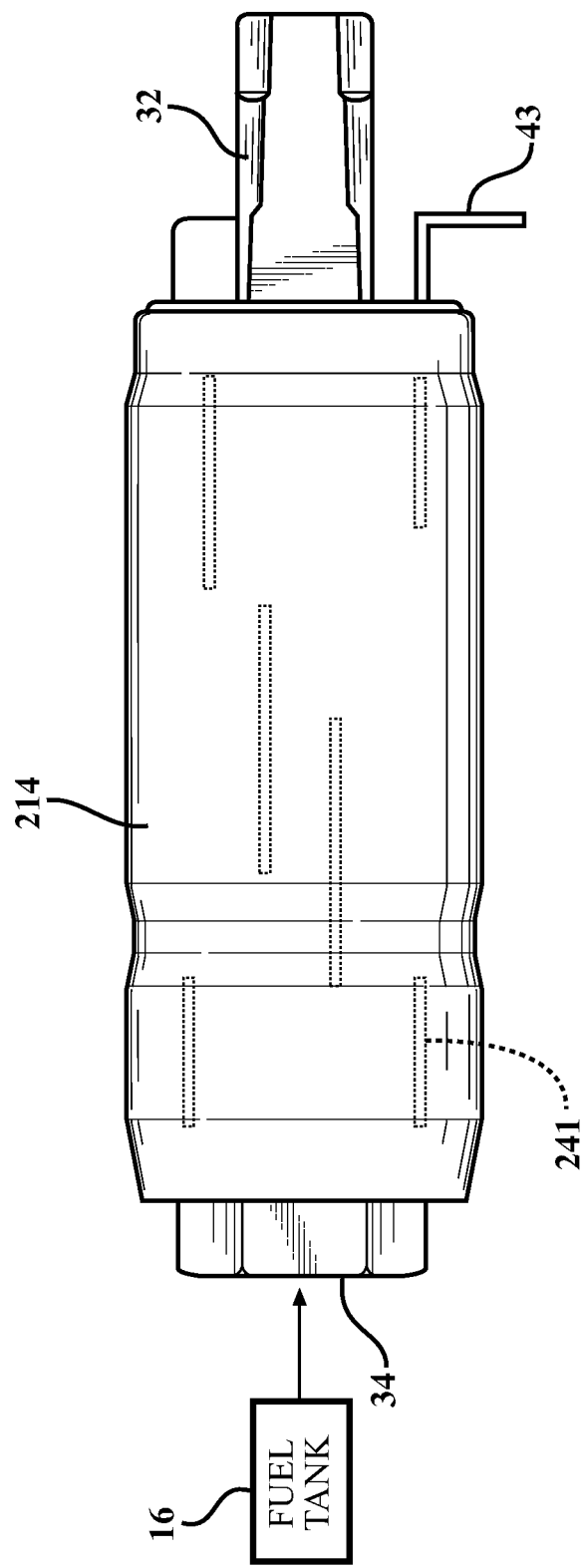
FIG. 6 illustrates another exemplary fuel pump for use in a propulsion assembly in accordance with one embodiment of the invention.

FIG. 4 illustrates an exemplary fuel pump for use in a propulsion system in accordance with one embodiment of the invention. Similar to the fuel pump disclosed in FIG. 3, the assembly 10 includes an internal combustion engine. A fuel pump 14 is driven by the engine for pumping fuel from a fuel tank 16 to the internal combustion engine. In one embodiment of the invention (as illustrated in FIG. 4), a cooling material 41 is disposed about the fuel pump 14 to form an outer surface (or jacket/sleeve/cover) of the fuel pump 14 to act as a cooling mechanism for the fuel pump 14. The cooling material 41 may cover the entire fuel pump 14 (as illustrated) or only a portion of the fuel pump or may form the housing or surface of fuel pump 14. That is, rather than being placed about the fuel pump 14, the cooling material 41 is the outer surface of the fuel pump. In other embodiments, the cooling material 141, 241 is disposed inside of the fuel pump 114, 214. For example, the material may form an inner sleeve of the fuel pump, or be disposed inside of the fuel pump in any location and be formed in any shape. For example, FIG. 5 shows the cooling material 141 as having a snake shape and being located inside of fuel pump 114, and FIG. 6 shows the cooling material 241 as individual plates located inside of fuel pump 214. It is appreciated that although an outer cooling material is disclosed in these embodiments, the invention is not limited to these illustrations and only the interior cooling material may be used without the exterior material. It is also appreciated that any combination of shapes may also be used, and that any combination of exterior and/or interior placement of the cooling material may be utilized.

The cooling material 41, 141, 241 is made of any material, such as a thermoelectric material, that is capable of cooling fuel in fuel pump 14, 114, 214. For example, the material may be a cold plate or thermoelectric module (Peltier) which transfers heat from one side of the device to the other side against the temperature gradient (from cold to hot), with consumption of electrical energy. It is understood, however, that any material known to the skilled artisan may be used and the invention is not limited to the described exemplary embodiment. Additionally, the thermoelectric material is supplied energy from a power source through electrical leads 43. The power source may be the engine, battery, or any other source as known in the art.

In the described embodiment of the propulsion system of the invention, the engine is a marine engine for use, for example, with water craft. However, the engine of the instant propulsion system is not limited to marine engines, and may be utilized in any engine, marine or otherwise. Here, with reference to FIGS. 4-6, the fuel pump 14, 114, 214 extends longitudinally along an axis between first and second ends, i.e., a first end having a fuel outlet 32 and a second end having a fuel inlet 34. The cooling material, in the embodiment of FIG. 4 (in which the housing is fabricated of the cooling material, extends in a cylinder around the longitudinal axis of the fuel pump 14 between the first and second ends thereof. The cooling material 41 is in sealing engagement with the outer surface of fuel pump 14. The cooling material 41 may be formed as an integral member extending cylindrically around the fuel pump 14 between the ends thereof, formed by several members configured to form an integral member, or formed as separate members configured to cover a portion of the fuel pump 14.

In the embodiment of FIG. 5, the cooling material 141 (which is formed inside of the fuel pump in a snake shape) extends in a horizontal plane of the fuel pump 114 between first and second ends thereof. An exterior cooling material may be used together with the internal cooling material 141, or removed such that only the interior cooling material 141 is utilized.

In FIG. 6, the cooling material 241 (which is formed inside of the fuel pump as plates) is disposed in various locations inside of the fuel pump 241 to assist in cooling fuel pumped there-through. In the disclosed embodiment, multiple plates are used for this purpose. However, it should be appreciated that one or more plates, in any desired location, may be used for cooling purposes. Similar to the cooling material in FIG. 5, the exterior cooling material may be used together with the internal cooling material 241, or removed such that only the interior cooling material 241 is utilized.

The invention therefore includes a system and method of cooling a fuel pump 14, 114, 214 for an engine that eliminates the need for a heat exchanger and reduces the complexity of the fuel pump and propulsion system since various elements, such as a water intake, water pump, vapor separator, etc. are no longer required.

The foregoing invention has been described in accordance with the relevant legal standards, thus the description is exemplary rather than limiting in nature. Variations and modifications to the disclosed embodiment may become apparent to those skilled in the art and do come within the scope of the invention. Accordingly, the scope of legal protection afforded this invention can only be determined by studying the following claims.

We claim:

1. A propulsion assembly comprising:
   an internal combustion engine; and
   a fuel pump for pumping fuel from a fuel tank to said internal combustion engine, wherein said fuel pump has a housing with a fuel outlet and a fuel inlet, wherein said housing is at least partially made of a thermoelectric cooling material for reducing a temperature of the fuel being pumped by the fuel pump, wherein an exterior surface of the housing is formed from the thermoelectric cooling material, wherein a cooling jacket is not disposed about the fuel pump, and wherein said thermoelectric cooling material forms the entire housing of said fuel pump.

2. The propulsion assembly of claim 1, wherein said internal combustion engine is a marine engine.

3. The propulsion assembly of claim 1, wherein the thermoelectric cooling material reduces the temperature of the fuel being pumped by the fuel pump by the thermoelectric cooling material consuming electrical energy.

4. The propulsion assembly of claim 3, wherein said electrical energy is provided by a battery.

5. The propulsion assembly of claim 3, wherein said electrical energy is provided by said internal combustion engine.

6. A fuel pump for pumping fuel from a fuel tank to an internal combustion engine, where the fuel pump comprises:
   a housing having a fuel outlet and a fuel inlet, wherein said housing is at least partially made of a thermoelectric cooling material for reducing a temperature of the fuel in the fuel pump, wherein an exterior surface of the housing is formed from the thermoelectric cooling material, wherein a cooling jacket is not disposed about the fuel pump, and wherein said thermoelectric cooling material forms the entire housing of the fuel pump.

7. The fuel pump of claim 6, wherein said fuel pump is designed for use with a marine engine.

8. The fuel pump of claim 6, wherein the thermoelectric cooling material reduces the temperature of the fuel in the fuel pump by the thermoelectric cooling material consuming electrical energy.

9. The fuel pump of claim 8, wherein said electrical energy is provided by a battery.

10. The fuel pump of claim 8, wherein said electrical energy is provided by an internal combustion engine.

\* \* \* \* \*